United States Patent [19]

Riesselmann

[11] Patent Number: 4,715,273
[45] Date of Patent: Dec. 29, 1987

[54] COOKING APPARATUS

[76] Inventor: Gottfried Riesselmann, Achtern Diek 34, 2248 Vechta, Fed. Rep. of Germany

[21] Appl. No.: 895,657
[22] Filed: Aug. 12, 1986

[30] Foreign Application Priority Data

Aug. 16, 1985 [DE] Fed. Rep. of Germany ....... 3529424

[51] Int. Cl.⁴ .............................................. A22C 7/00
[52] U.S. Cl. ........................................ 99/442; 99/419; 99/427; 99/382; 219/523
[58] Field of Search ............. 99/442, 426, 420, 421 H, 99/421 HV, 421 R, 419, 427, 358, 382; 219/523, 441, 435, 436; 126/137, 25 AA, 9 R

[56] References Cited

U.S. PATENT DOCUMENTS

| 3,026,400 | 3/1962 | Sciver | 99/421 H |
| 3,563,159 | 2/1971 | Johnson | 99/421 H |
| 3,745,910 | 7/1973 | Delamater | 99/419 |
| 3,812,776 | 5/1974 | Kean | 99/421 H |
| 3,980,010 | 9/1976 | Collinucci | 99/421 H |
| 4,436,024 | 3/1984 | Arden et al. | 99/421 HV |

FOREIGN PATENT DOCUMENTS

| 217592 | 10/1961 | Austria | 99/419 |
| 527202 | 7/1956 | Canada | 219/523 |
| 1579518 | 8/1970 | Fed. Rep. of Germany . | |
| 2554067 | 8/1977 | Fed. Rep. of Germany . | |
| 1450747 | 7/1965 | France | 99/421 V |
| 637534 | 8/1983 | Switzerland | 99/421 V |
| 610367 | of 0000 | United Kingdom | 99/419 |
| 822286 | 10/1959 | United Kingdom | 219/523 |
| 1140386 | 1/1969 | United Kingdom | 99/421 R |

Primary Examiner—Louis K. Rimrodt
Assistant Examiner—J. L. Olds

[57] ABSTRACT

The invention concerns a process for cooking and preferably roasting or grilling food, in particular food with an accessible cavity such as fowl or the like, wherein the food is heated simultaneously externally and internally and when preferably at least one heater element is inserted into the food.

An apparatus implementing the process of the invention is characterized by a food receiving chamber and by a heating system associated with the food receiving chamber that supplies both external and internal heat to the food, this system preferably including at least one one external heater element and one inside heater element insertable into the food. Preferably the inside heater element is electrical and preferably it is substantially rod-like.

21 Claims, 4 Drawing Figures

COOKING APPARATUS

The invention concerns a process and apparatus for cooking, to completion, in particular for roasting or grilling foods especially with an accessible cavity such as fowl or the like.

Cooking apparatus are commercially available which employ a procedure where the substance in its receiving chamber is cooked by being moved to the vicinity of heater elements in the receiving chamber & by being externally heated.

The object of the invention is to improve the known cooking procedure so as to shorten the required time for cooking.

The solution provided by the invention is characterized in that the sub-stance to be cooked is heated both externally and internally.

In the process of the invention, the heat supplied to the substance being cooked is not required to penetrate from the outside into the inside of the substance because the inside of the substance receives heat simultaneously with the outside, so that only a shorter cooking time is required to prepare the food. Therefore the process of the invention makes possible a saving in energy. Furthermore the process of the invention offers the advantage that the food is approximately uniformly heated through and through, whereby this food reaches approximately simultaneously everywhere the condition desired for consumption.

Preferably at least one heater element is introduced into the food to heat it from the inside. The heater element may be designed as a probe whereby it can easily enter the food. This is easily implemented especially for drawn fowl or the like and for meats which have an accessible cavity in them. In order to also make possible proper cooking inside food lacking a cavity, the heating element in particular may be designed as a split so it may pierce through the food.

One apparatus of the invention for carrying out its process is characterized by a cooking receiving chamber and by a heating system associated with this chamber that supplies heat to the food externally and internally. Where the food has an accessible cavity, the inside supply of heat illustratively may be implemented by a blower of the heating system blowing hot air or steam into the cavity.

In a preferred embodiment of the apparatus of the invention, the heating system includes at least one external heater element and at least one inside heater element which can be inserted into the food. The outer heater element for instance may an electrical heating plate, a heater coil or a similar heating element mounted in the food receiving chamber, but illustratively several outer heater elements forming the walls of the food receiving chamber may be used, with the food placed between them. Because of the insertable inside heater element, the food also can be advantageously heated-for instance if the inside heater assumes the shape of a spit-when the food lacks an accessible cavity. Advantageously the inside heater element may be designed so it will pass through several pieces of food placed in series against each other. Advantageously, almost any known cooking apparatus may be economically retrofitted in simple manner with an inside heater element of the invention and thereby be converted into an apparatus of the invention.

Preferably the inside heater element is designed to be electrically heated because especially an electrical heater element allows heating the food while preserving its taste. Furthermore the electrical heater element can be controlled in simple manner by electrical switches, and in particular it can be regulated. Illustratively the inside heater element may include an energized electrical heating resistor, or it may be an especially rapidly acting microwave transmitter, or it may include an inductive heating coil, or it may be energized electrically in some other way.

The inside heater element can be made in especially economical manner when it is thermally conducting and connected to a heat source of the heating system, or if it includes one conduit with at least one discharge orifice for a heating medium in communication with a heat medium reservoir of the heating system. Illustratively the heating medium may be hot air or steam. In particular, the inside heater element may be designed as a nozzle whereby the heating medium may fed into the food, also into small cavities, as a concentrated and focused or collimated stream.

Preferably the inside heater element shall be extensively in the shape of a rod or bar to allow easy insertion into the food.

In a further development of the invention, the inside heater element projects by one end from a sidewall of the food receiving chamber to which it is mounted in an approximately perpendicular manner to this sidewall. the inside heater element mounted in such a manner advantageously may be used simultaneously as the food support by empaling the food on the inside heater element which then will keep it in place. Also and in illustrative manner, the inside heater element may be mounted by its two ends into fastening means provided for that purpose at mutually opposite sidewalls, in particular if the design of the inside heater element is such that several sequentially following food pieces can be placed on the inside heater element.

Preferably a fixing element for the food is additionally and preferably it is detachably mounted to the inside heater element and is designed in such a manner as to prevent the food from slipping off the inside heater element.

Preferably the fastener element includes at least one elastic clamping element which projects radially from the inside heater element when the fastener element is set on this heater element. When the food is slipped on, the illustratively elastic clamping element will briefly yield in the direction of the inside heater element and then will jam into the food. In a preferred embodiment of the apparatus of the invention, the fastener element includes a holding ring which is slipped on the rod-like insider heater element, with leaf spring clips bent outward in a zone and substantially parallel to the annular axis of the holding ring being mounted on this ring. In this holding ring slipped on the inside heater element, the leaf spring clips enclose in sleeve-like manner the inside heater element, radially projecting in one preferably convex sector from the inside heater element. The food may be slipped onto the fastener element by its cavity, the food zone surrounding the cavity aperture briefly forcing the leaf spring clips inward before they snap back outward again when inside the cavity and whereby they lock the food. The food can be slipped onto the fastener element mounted on the inside heater element, but alternatively first the fastener element may be slipped into the food and thereupon it may be placed on the inside heater element. Preferably the holding ring is fixed in place by a locking screw in a predetermined position on the inside heater element.

In a further development of the invention, the inside heater element is rotatably supported on a sidewall of the food receiving chamber and the inside heater element is linked to a controlled drive unit. By rotating the inside heater element, the food empaled on the inside heater element illustratively can be set in rotation or be pivoted to and fro through an angle less than 360°, whereby the food will also be uniformly heated externally if for instance external heater elements are mounted only in a restricted region of the food receiving chamber for economic reasons. The inside heater element may be rotatably supported about its central longitudinal axis, but illustratively also several inside heater elements may be arranged in parallel equidistant manner on the periphery of a rotatably supported disk or plate, with the food being supported by these inside heater elements.

If the the inside heater elements are heated electrically, the connection made between the inside heater elements and a power source is implemented in a preferred embodiment of the invention by means of slide contacts whereby electrical connection also shall be constantly assured for a rotating inside heater element and whereby rotation of the inside heater element is possible without cable twisting.

The drawing shows an illustrative embodiment including further features of the invention.

Figure 1:
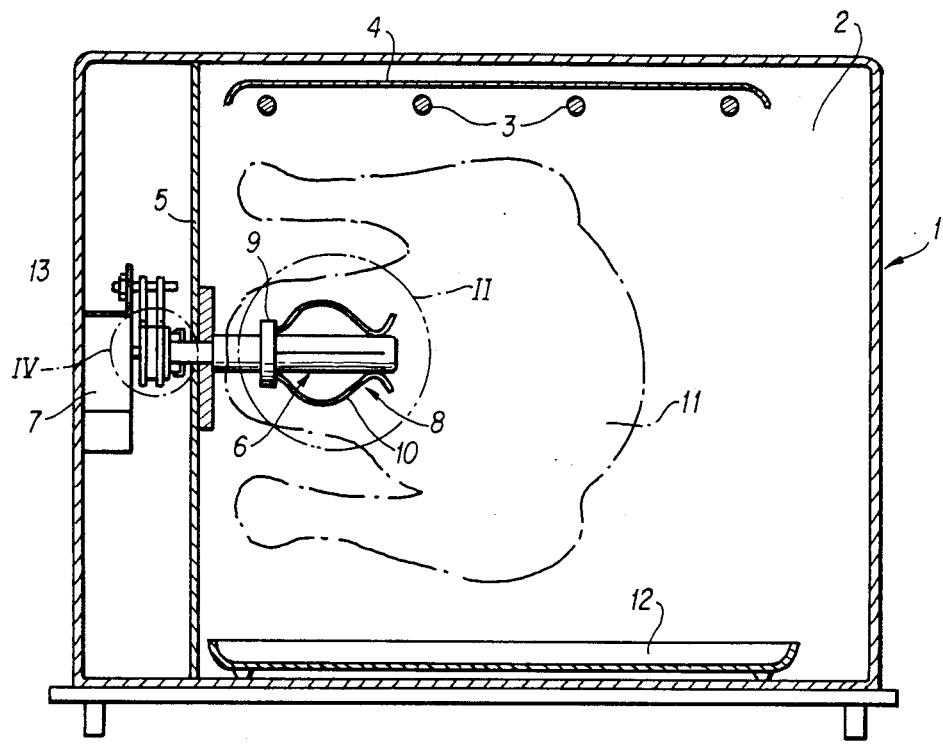
FIG. 1 is a section through an apparatus of the invention.

FIG. 1 is a cross-section of an apparatus of the invention. This apparatus of the invention comprises a housing 1 inside which there is a food receiving chamber 2. External heater elements 3 are mounted in the vicinity of the ceiling of the housing 1, which when energized will radiate heat and which are screened from the ceiling of the housing 1 by a reflector baffle 4. A rod-shaped inside heater element 6 is mounted below the external heater elements 3 on one sidewall 5 of the food receiving chamber 2 so as to be approximately orthogonally projecting from this sidewall 5. The inside heater element 6 is rotatably supported about its central longitudinal axis and is linked to a drive unit 7 located on the other side of the sidewall 5. A fastener element 8 is detachably slipped on the inside heater element 6 and comprises a holding ring 9 on which are held leaf spring clips 10 which are substantially parallel to the annular axis of the holding ring 9, these clips being so bent that they project radially in elastic manner from the inside heater element 6 across a given zone. As indicated by the dashed lines in FIG. 1, a food 11, for instance a chicken, can be plugged onto the fastener element 8. A liquid collecting pan 12 is mounted on the bottom of the housing 1 and collects the drips when the food 11 is being cooked.

The inside heater element 6 is an electrical element and is provided at its end facing the drive unit 7 with slider contacts 13 assuring constant electrical connection between the inside heater element 6 and a power source even when the inside heater element 6 is rotating.

Figure 2:
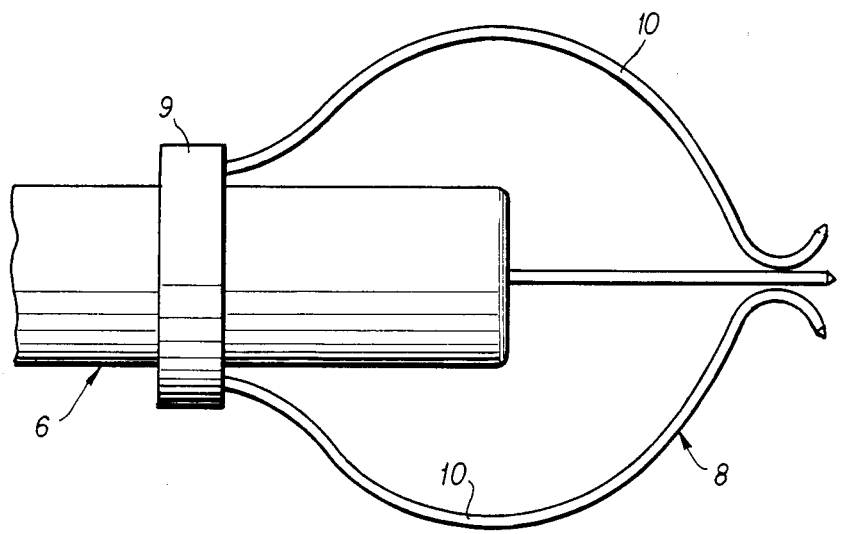
FIG. 2 shows the cutaway denoted by II in FIG. 1 of an inside heater element, on an enlarged scale.

The cutaway denoted by II in FIG. 1 of the inside heater element 6 is shown on an enlarged scale in FIG. 2. Identical components are denoted by the same references as in FIG. 1 FIG. 2 in particular shows the design of the fastener elements 8.

Figure 3:
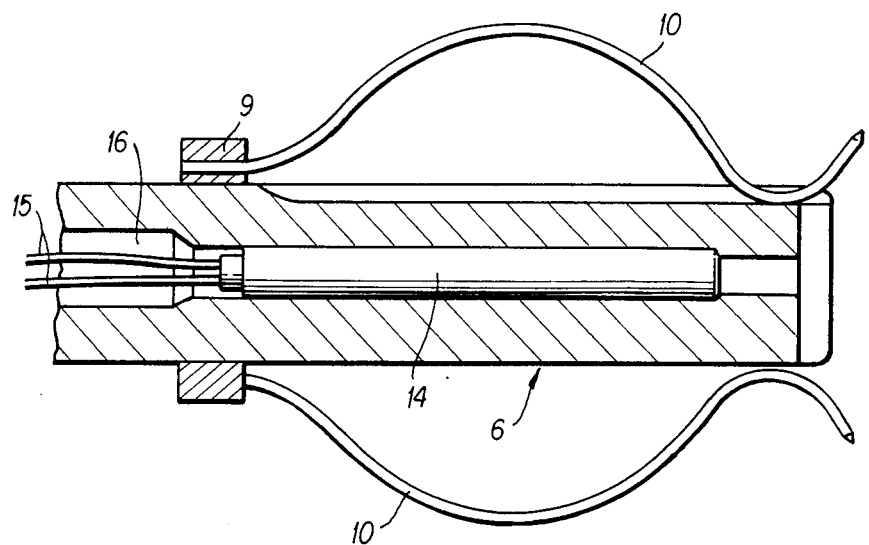
FIG. 3 is the cutaway of the inside heater element of FIG. 2 in longitudinal section.

FIG. 3 shows the cutaway of FIG. 2 in section. The same components are denoted by the same references as in FIGS. 1 and 2. A heater resistor 14 can be noted within the inside heater element 6 and is connected to the electrical hook-up cable 15 passing through a cavity 16 along the central longitudinal axis of the inside heater element 6.

Figure 4:
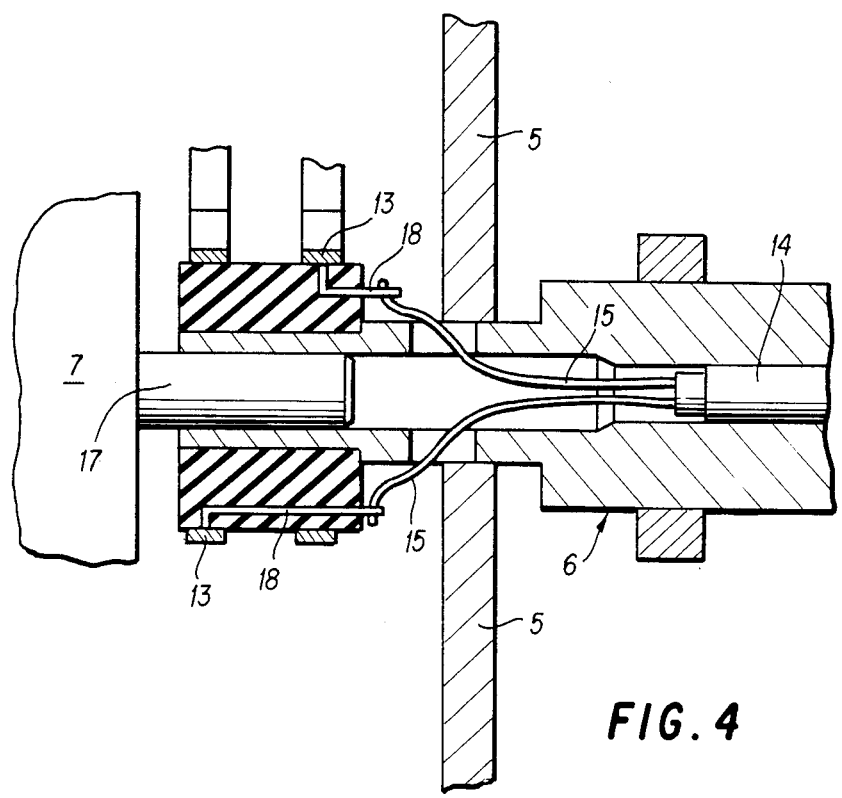
FIG. 4 shows the cutaway denoted by IV in FIG. 1 of an end region of an inside heater element, in section and on an enlarged scale.

FIG. 4 shows on an enlarged scale and in section the drive-side end region denoted by IV in FIG. 1 of the inside heater element 6. The same components are denoted by the same references as in FIGS. 1 and 3. FIG. 4 in particular shows that the inside heater element 6 is mounted on an output shaft 17 of the drive unit 7 and that the hook-up cable 15 is connected to slip rings 18 connected electrically to slider contacts 13.

I claim:

1. In an apparatus for cooking food and preferably food having or capable of being formed with an accessible cavity, the cooking apparatus having at least one heating element adapted to be inserted into the cavity in order to heat the food internally from within the cavity, the improvement comprising:

means associated with the heating element for supporting at least portions of the food in fixed relation to the heating element wherein said means is in a first position when said heating element is in a first position and are biased towards the food in a second position when said heating element is in a second position vis-a-vis said means.

2. In the apparatus of claim 1 wherein the said means comprises a plurality of elastic clip elements each having an arcuate portion and an impaling portion, the arcuate portion of each said element being adapted to contact walls of the food cavity to support the food relative to the heating element and the impaling portion being adapted to pierce the food to maintain the food in a fixed position relative to the heating element.

3. In the apparatus of claim 2 wherein each elastic clip element is formed of a length of elastic material with the arcuate portion occupying at least a medial portion of the clip element and the impaling portion comprising a recurved distal portion of the clip element.

4. In an apparatus for cooking food and preferably food having or capable of being formed with an accessible cavity, the cooking apparatus having at least one heating element adapted to be inserted into the cavity in order to heat the food internally from within the cavity, the improvement comprising means associated with the heating element for supporting at least portions of the food in fixed relation to the heating element and for impaling the food in order to maintain the food in a fixed position relative to the heating element.

5. In the apparatus of claim 4 wherein said means is in a first position when the heating element is in a first position vis-a-vis said means and is in second position biased towards the food when the heating element is in a second position vis-a-vis said means.

6. In the apparatus of claim 4 wherein the supporting and impaling means comprise at least one elastic clip element having an arcuate portion and an impaling portion, the arcuate portion being adapted to contact walls of the food cavity to support the food relative to the heating element and the impaling portion being adapted to pierce the food to maintain the food in a fixed position relative to the heating element.

7. In the apparatus of claim 4 wherein the supporting and impaling means comprise a plurality of elastic clip elements each having an arcuate portion and an impaling portion, the arcuate portion of each said element being adapted to contact walls of the food cavity to support the food relative to the heating element and the impaling portion being adapted to pierce the food to maintain the food in a fixed position relative to the heating element.

8. In the apparatus of claim 7 wherein each elastic clip element is formed of a length of elastic material with the arcuate portion occupying at least a medial portion of the clip element and the impaling portion comprising a recurved distal portion of the clip element.

9. In the apparatus of claim 7 wherein the supporting and impaling means further comprise a mounting element for holding the elastic clip elements.

10. In the apparatus of claim 9 wherein the heating element is formed in the shape of a rod, the apparatus further comprising means for detachably mounting the mounting element to the heating element.

11. In the apparatus of claim 10 wherein the apparatus further comprises means for heating the food externally of the food and means for rotating the heating element, the supporting and impaling means being rotatable with the heating element to expose external portions of the food to the externally disposed heating means.

12. In the apparatus of claim 10 wherein the means mounting the mounting element to the heating element comprises a ring which is received on the heating element, the arcuate portions of the elastic clips elements extending outwardly from the heating element.

13. In the apparatus of claim 12 wherein the longitudinal axes of the elastic clip elements are disposed substantially parallel to the longitudinal axis of the heating element and at regular intervals about the heating element.

14. In the apparatus of claim 4 wherein the apparatus further comprises means for heating the food externally of the food and for rotating the heating element, the supporting and impaling means being rotatable with the heating element to expose external portions of the food to the externally disposed heating means.

15. In the apparatus of claim 14 and further comprising means for providing electrical power to the heating means and to the heating element to produce heat for cooking of the food.

16. In the apparatus of claim 14 wherein the apparatus includes a food receiving chamber having at least one wall, the heating means and the heating element being disposed within the food receiving chamber, the means for rotating the heating element being mounted in said wall.

17. In the apparatus of claim 16 wherein the heating element projects substantially horizontally into the food receiving chamber.

18. In the apparatus of claim 14 wherein the heating element includes an electrically powered resistor.

19. In the apparatus of claim 14 wherein the heating element includes a microwave transmittor.

20. In the apparatus of claim 14 wherein the heating element includes a conduit having at least one discharge aperture, the apparatus further comprising means for directing a fluid heating medium into the conduit of the heating element for discharge through the aperture into contact with the food.

21. In the apparatus of claim 13 wherein the distal ends of the elastic clip elements are biased toward each other when the rod-shaped heating element does not mount the clip elements, the distal ends of the clip elements being biased apart on receipt of the distal end of the heating element therebetween.

* * * * *